US008911658B2

(12) United States Patent
Jiang

(10) Patent No.: US 8,911,658 B2
(45) Date of Patent: Dec. 16, 2014

(54) LASER MARKING OF POLYMER MATERIALS

(75) Inventor: Shibin Jiang, Tucson, AZ (US)

(73) Assignee: Advalue Photonics, Inc., Tucson, AZ (US)

( * ) Notice: Subject to any disclaimer, the term of this patent is extended or adjusted under 35 U.S.C. 154(b) by 303 days.

(21) Appl. No.: 13/450,367

(22) Filed: Apr. 18, 2012

(65) Prior Publication Data

US 2013/0279527 A1 Oct. 24, 2013

(51) Int. Cl.
*B29C 67/00* (2006.01)
*B23K 26/40* (2014.01)

(52) U.S. Cl.
USPC ................ 264/400; 264/485; 372/10; 372/18

(58) Field of Classification Search
None
See application file for complete search history.

(56) References Cited

U.S. PATENT DOCUMENTS

| | | | | |
|---|---|---|---|---|
| 5,560,845 | A | 10/1996 | Birmingham, Jr. et al. | |
| 5,789,466 | A | 8/1998 | Birmingham, Jr. et al. | |
| 6,825,265 | B2 | 11/2004 | Daga et al. | |
| 7,106,762 | B1 * | 9/2006 | Jiang et al. | 372/6 |

OTHER PUBLICATIONS

El-Sherif et al, High-peak-power operation of a Q-switched Tm3+-doped silica fiber laser operating near 2 um, Optics Letters, vol. 28, No. 1, pp. 22-24, Jan. 1, 2003.*

Sharp et al, 190-fs passively mode-locked thulium fiber laser with a low threshold, Optics Letters, vol. 21, No. 12, pp. 881-883, Jun. 15, 1996.*

* cited by examiner

*Primary Examiner* — Benjamin Schiffman
(74) *Attorney, Agent, or Firm* — Dale F. Regelman; Nikia L. Gray; Quarles & Brady LLP

(57) ABSTRACT

A system and method for efficiently laser marking a polymer target material, and more particularly a transparent polymer target material, is presented. The system includes a visually transparent polymer target material comprising a surface and a near 2 μm fiber laser, the fiber laser having a peak power equal to or greater than 10 kW, a pulse repetition rate equal to or greater than 1 kHz, and an average power equal to or less than 20 W. In certain embodiments, the fiber laser may be a Q-switched fiber laser having a pulse width equal to or less than 200 ns or a mode-locked fiber laser having a pulse width equal to or less than 100 ps. The method includes producing, using the fiber laser, a mark that is not transparent to visible wavelengths on the surface of the polymer target material without damaging it.

10 Claims, 3 Drawing Sheets

LASER MARKING OF POLYMER MATERIALS

FIELD OF THE INVENTION

Various implementations, and combinations thereof, are related to laser marking of polymer materials and more particularly to laser marking of transparent polymer materials using 2 micron high peak power mode-locked or Q-Switched fiber lasers.

BACKGROUND OF THE INVENTION

Laser marking, also called laser engraving, refers to using a laser to make a readable mark on an object. Unlike traditional marking or engraving techniques, laser marking does not involve the use of inks or tool bits which come in contact with the target surface and need to be regularly replaced. Rather, with laser marking, a laser is used to remove portions of the target material to produce permanent marks. Specifically, the laser power is absorbed by the target material where the laser touches its surface, causing a rapid increase in temperature that vaporizes a portion of the target material, leaving a permanent mark. Laser marking is particularly useful in production, product distribution, and quality control applications.

Typically, high average power lasers with an average power of greater than 10 W or high pulse energy lasers with pulse energy near 1 mJ are used for laser marking applications. Examples of lasers that are commonly used include $CO_2$ lasers at 10.6 micron wavelength, ND; YAG lasers at 1064 nm, frequency doubled and tripled 532 nm and 355 nm lasers, and Yb-doped fiber lasers near 1 μm. Normally, the laser and target material are matched such that the target material exhibits a strong absorption at the laser wavelength being used. When the power and energy are increased even further, the laser can be used to cut or drill holes on the target material.

As polymers are widely used for industrial and consumer applications, the ability to efficiently laser mark polymer materials is important. For pigmented polymers the process is relatively straight forward as a laser that matches the absorption wavelength of the colored polymer material can be used. However, currently the ability to laser mark visually transparent polymers with minimal damage to the target object is limited. The most popular technique is to add pigment into the polymer and to use a UV laser for marking. Often the additive is titanium dioxide and when the laser is directed at the additive-containing polymer, the photosensitive titanium dioxide changes color as a result of the laser-induced reduction of $Ti^{4+}$ (colorless) to $Ti^{3+}$ (blue-black) in the titanium dioxide lattice. The use of titanium dioxide in a fluoropolymer is disclosed in U.S. Pat. Nos. 5,560,845 and 5,789,466. Many other types of additives that can be used are disclosed in other U.S. patents, such as U.S. Pat. No. 6,825,265.

However, the requirement to add pigments to transparent polymers in order to utilize laser marking limits its application and increases the complexity of the laser marking process, thereby increasing the overall cost. Thus, there is a need for the ability to laser mark transparent polymers without the use of additives.

SUMMARY OF THE INVENTION

In one implementation, a method of efficiently laser marking a polymer target material is provided. The method includes providing a visually transparent polymer target material comprising a surface and a near 2 μm fiber laser, the fiber laser having a peak power equal to or greater than 10 kW, a pulse repetition rate equal to or greater than 1 kHz, and an average power equal to or less than 20 W. In certain embodiments, the fiber laser may be a Q-switched fiber laser having a pulse width equal to or less than 200 ns or a mode-locked fiber laser having a pulse width equal to or less than 100 ps. The method further includes producing, using the fiber laser, a mark that is not transparent to visible wavelengths on the surface of the polymer target material without damaging it.

In another implementation, a system for efficiently laser marking a surface of a polymer target material that is transparent at visible wavelengths is provided. The system includes a near 2 μm fiber laser, the fiber laser having a peak power equal to or greater than 10 kW, a pulse repetition rate equal to or greater than 1 kHz, and an average power equal to or less than 20 W, and a computer system having a computer processor in communication with a non-transitory computer readable medium having computer readable program code disposed therein comprising a series of computer readable program steps to effect producing, using the fiber laser, a mark that is not transparent to visible wavelengths on the surface of the polymer target material without damaging the surface of the polymer target material. In certain embodiments, the fiber laser may be a Q-switched fiber laser having a pulse width equal to or less than 200 ns or a mode-locked fiber laser having a pulse width equal to or less than 100 ps.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

Figure 1:
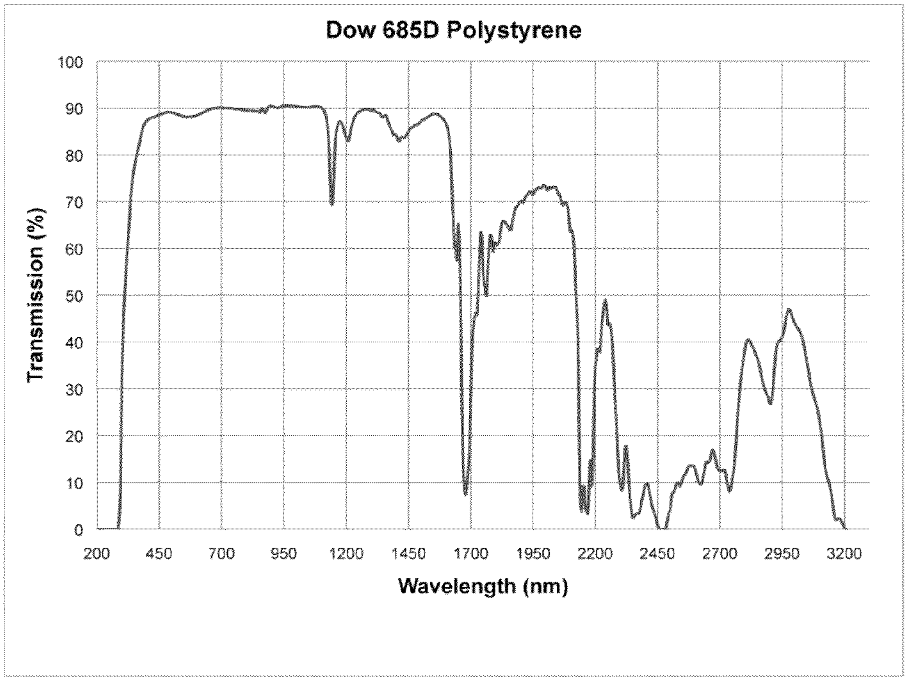
FIG. 1 is a graph of the absorption spectrum of a typical polymer material.

The present disclosure proposes a novel system for laser marking transparent polymers without the need to use additive materials. Throughout the following description, this invention is described in preferred embodiments with reference to the figures in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment, "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention utilizes a near 2 μm high peak power fiber laser to laser mark transparent polymer target materials without the need for additive materials. Near 2 micron means wavelengths from 1.7 micron to 2.2 micron, which can be generated from thulium ions and/or holmium ions. More specifically, the present invention uses a laser having a peak power equal to or greater than 10 kW, a pulse repetition rate equal to or greater than 1 kHz, and an average power equal to or less than 20 W. In certain embodiments, the laser is a Q-switched fiber laser with a pulse width equal to or less than 200 ns. In other embodiments, the laser is a mode-locked fiber laser with a pulse width equal to or less than 100 ps.

By definition, transparent polymers are polymers that are transparent to visible wavelengths. However, most polymers, including those that are transparent, will absorb radiation near the 2 μm region. FIG. 1 illustrates the absorption spectrum of polystyrene which shows that such polymer material will absorb the radiation from a 2 μm laser. One of ordinary skill in the art will appreciate that polymers comprising other chemical structures, such as and without limitation, carbonates, esters, amides, imides, and the like also absorb radiation near the 2 μm region.

However, it is important to appreciate that the invention disclosed herein does not rely on linear absorption of laser power alone. Because the invention utilizes a laser having a high pulse repetition rate and a high peak power, when a given physical area is modified by two consecutive pulses, the pulse-to-pulse overlap causes the absorption of the subsequent pulse to be nonlinear. This results in a permanent mark on the polymer that is darker than the polymer itself at visible wavelengths, i.e., the mark is not transparent to visible light. Additionally, because the laser used has a relatively low average power and low pulse energy, Applicant's novel method produces the mark without damaging the surface of the polymer target material. By this, Applicant means that the surface of the target material is not ablated, scratched, burned, or otherwise adversely blemished. In certain embodiments, Applicant's method contacts the surface with laser energy such that the laser energy changes the polymer morphology at the laser energy contact site to form a modified morphology that diffracts visible light.

The nonlinear absorption of the laser used in Applicant's novel laser marking system has further benefits, including that the polymer surface can be very smooth after the laser marking process. In certain embodiments the surface roughness is better than 10 μm. When the surface roughness is small, the marking will not be easily scratched and, in some cases, cannot be felt, which is important in many commercial applications.

Additionally, because of the nonlinear absorption, the temperature of the polymer material can be less than 150 degrees C. at 500 μm below the surface of the target material. This is significantly colder than standard laser marking techniques, making Applicant's novel laser marking system extremely useful for many processes where the transfer of heat below the target surface can damage the product, such as when marking the surface of polymer coated electronics.

Applicant's laser marking system further results in a very effective laser marking process. In certain embodiments, the laser marking speed can be from 10 cm/s to greater than 100 m/s. In certain embodiments, the laser marking speed is up to 1000 m/s.

In certain embodiments, a laser scanner is used to adjust the laser marking speed. Various types of laser scanners are well known in the art and one of ordinary skill will understand how to utilize the same in the context of laser marking. Further description therefore is outside the scope of the present invention.

Another advantage of using a near 2 μm laser in the present application is that such lasers are considered "retina safe," meaning they pose a relatively low risk of damaging the human retina because they are absorbed by the eye's cornea and lens. This is extremely useful for practical applications where eye safety is a concern.

In certain embodiments, an optical system is used to focus the laser beam near the surface of the polymer target material. Various types of optical systems for focusing a laser beam are well known in the art and one of ordinary skill will understand how to utilize the same in the context of laser marking. Further description therefore is outside the scope of the present invention.

Figure 2:
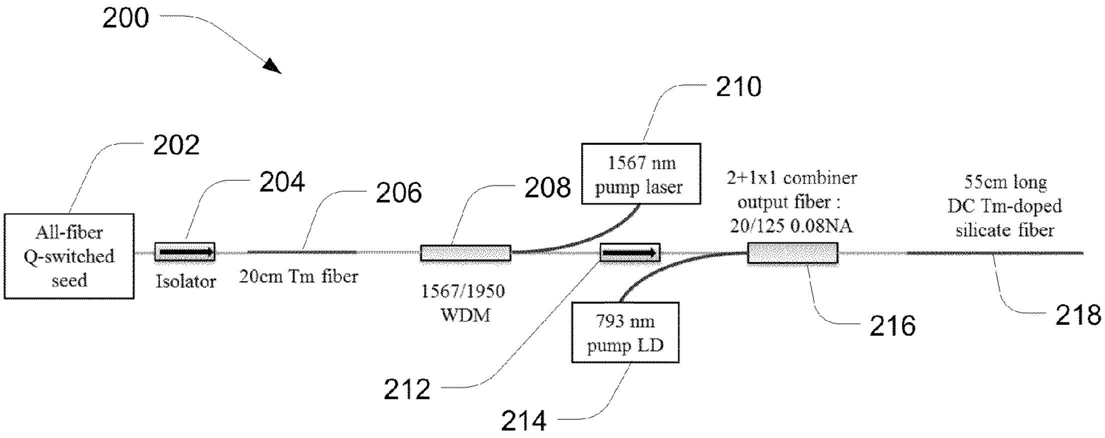
FIG. 2 is an optical schematic of an exemplary near 2 μm Q-switched fiber laser that can be used to perform laser marking according to Applicant's invention.

Turning now to FIG. 2, an exemplary embodiment of a near 2 μm Q-switched fiber laser that can be used to perform laser marking according to Applicant's invention is presented. As will be appreciated, a Q-switched laser is a laser that has active or passive Q-switching applied so that it emits energetic pulses and can be built in a variety of different manners. As such, the embodiment illustrated in FIG. 2 is meant to be illustrative and not limiting and one of ordinary skill in the art will appreciate that other forms of near 2 μm Q-switched fiber lasers can be used without departing from the scope of the present invention.

The exemplary near 2 μm Q-switched fiber laser 200 depicted in FIG. 2 comprises all-fiber Q-switched seed 202 comprising a 100 mW intensity modulated laser at 1950 nm, first isolator 204, a preamplifier and a power amplifier. The preamplifier in the present embodiment is composed of a 20 cm length of Tm-doped fiber 206, a 1567 nm/1950 nm WDM (wavelength-division multiplexer) 208, and a 1567 nm pump laser 210. The power amplifier comprises a 55 cm length of Tm-doped fiber 218 spliced to the output fiber of PM (2+1)×1 combiner 216 and is forward-pumped with laser diode 214, which in the illustrated embodiment is a 793 nm laser diode. In certain embodiments, the output of fiber 218 is angle-cleaved. In the illustrated embodiment, Q-switch fiber laser 200 further comprises a second isolator 212 optically connecting WDM 208 and combiner 216.

Fibers 206 and 218 are more specifically Tm-doped silicate glasses having a $Tm^{3+}$ doping concentration of 5 wt %. In the illustrate embodiment depicted in FIG. 2, fiber 206 has a double glass cladding where the first and second glass claddings are 125 μm and 150 μm respectively in diameter. The core of fiber 206 further has a diameter of 20 μm and a numerical aperture (NA) of 0.08. Fiber 206 has a cladding-pump absorption of 22 dB/m at 793 nm.

Fiber 218 is also a double cladding fiber but the second cladding is a polymer. The core and first cladding of fiber 218 have diameters of 21 μm and 127 μm respectively, and the NA of the core is 0.08 nm.

Figure 3A:
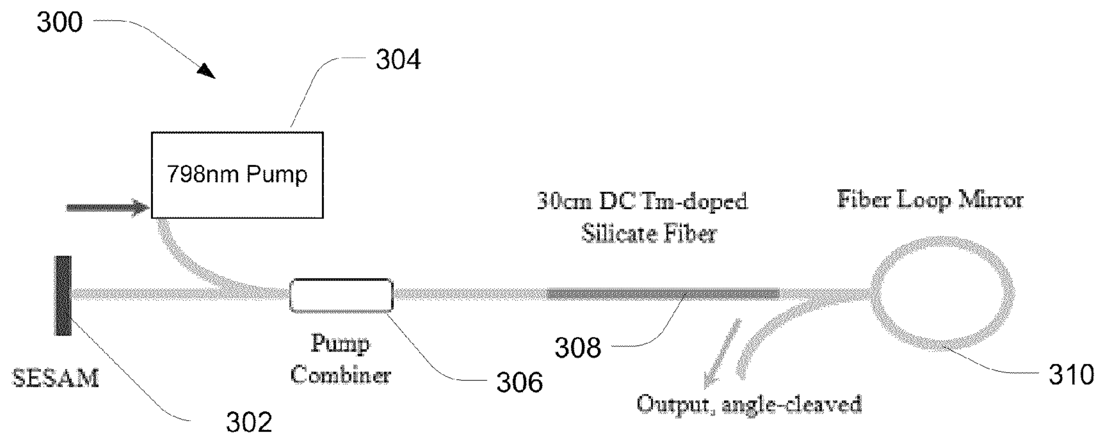
FIG. 3A is an optical schematic of an exemplary near 2 μm mode-locked fiber laser that can be used to perform laser marking according to Applicant's invention.
Figure 3B:
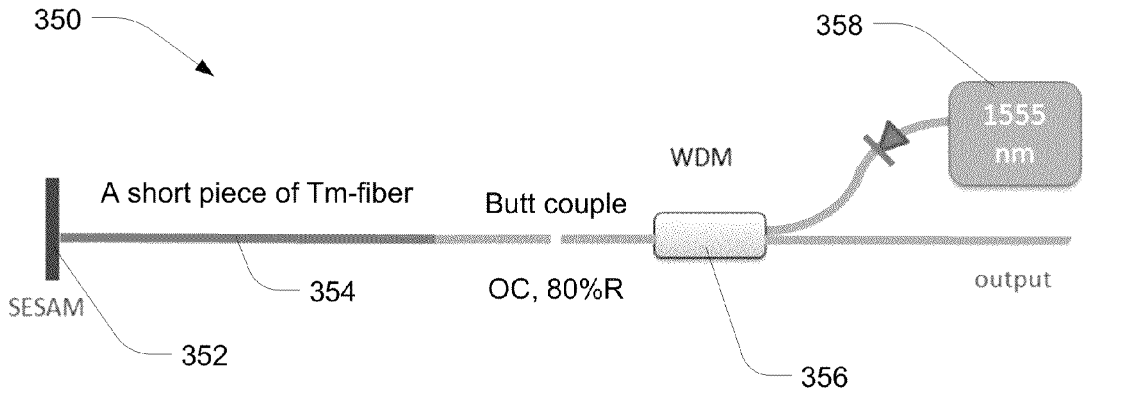
FIG. 3B is an optical schematic of an alternate near 2 μm mode-locked fiber laser that can be used to perform laser marking according to Applicant's invention.

FIGS. 3A and 3B depict exemplary embodiments of a near 2 μm mode-locked fiber laser that can be used to perform laser marking according to Applicant's invention. As will be appreciated, a mode-locked fiber laser is a fiber laser which is passively mode-locked for generating extremely short pulses and can be built in a variety of different manners. As such, the embodiments illustrated in FIGS. 3A and 3B are meant to be illustrative and not limiting and one of ordinary skill in the art will appreciate that other forms of near 2 μm mode-locked fiber lasers can be used without departing from the scope of the present invention.

The exemplary near 2 μm mode-locked fiber laser 300 depicted in FIG. 3A comprises a linear cavity formed by SESAM (semiconductor saturable absorber mirror) 302, pump combiner 306, a 20 cm length of double cladding Tm-doped silicate fiber 308 and fiber loop mirror 310. Mode-locked fiber laser 300 further comprises a 798 nm pump laser 304.

In the illustrated embodiment of FIG. 3A, fiber 308 is more specifically a Tm-doped silicate glasses having a $Tm^{3+}$ doping concentration of 5 wt %. Fiber 308 further has 10 μm core diameter. Further, in the illustrated embodiment, fiber loop mirror 310 is fabricated with a 50/50 fiber coupler and has a reflectivity of approximately 90% at 2 μm. By "approximately" Applicant means±2%.

In alternate embodiments, fiber 308 may be a Tm—Ho-codoped silicate fiber having a doping concentration of 6 wt % $Tm^{3+}$ and 0.4 wt % $Ho^{3+}$. In such embodiments, fiber loop mirror 310 has a reflectivity of approximately 70% at 2 μm.

FIG. 3B depicts an alternate embodiment of a high repetition rate 2 μm mode-locked fiber laser 350. In the illustrated embodiment of FIG. 3A, fiber laser 350 comprises a short piece of Tm-fiber 354 that is core-pumped with 1.55 μm fiber laser 358 through 1550 nm/1950 nm WDM 356. The laser cavity is closed by SESAM 352 and a fiber mirror (not shown). In certain embodiments fiber 354 is 8.4 cm long.

Figure 4:
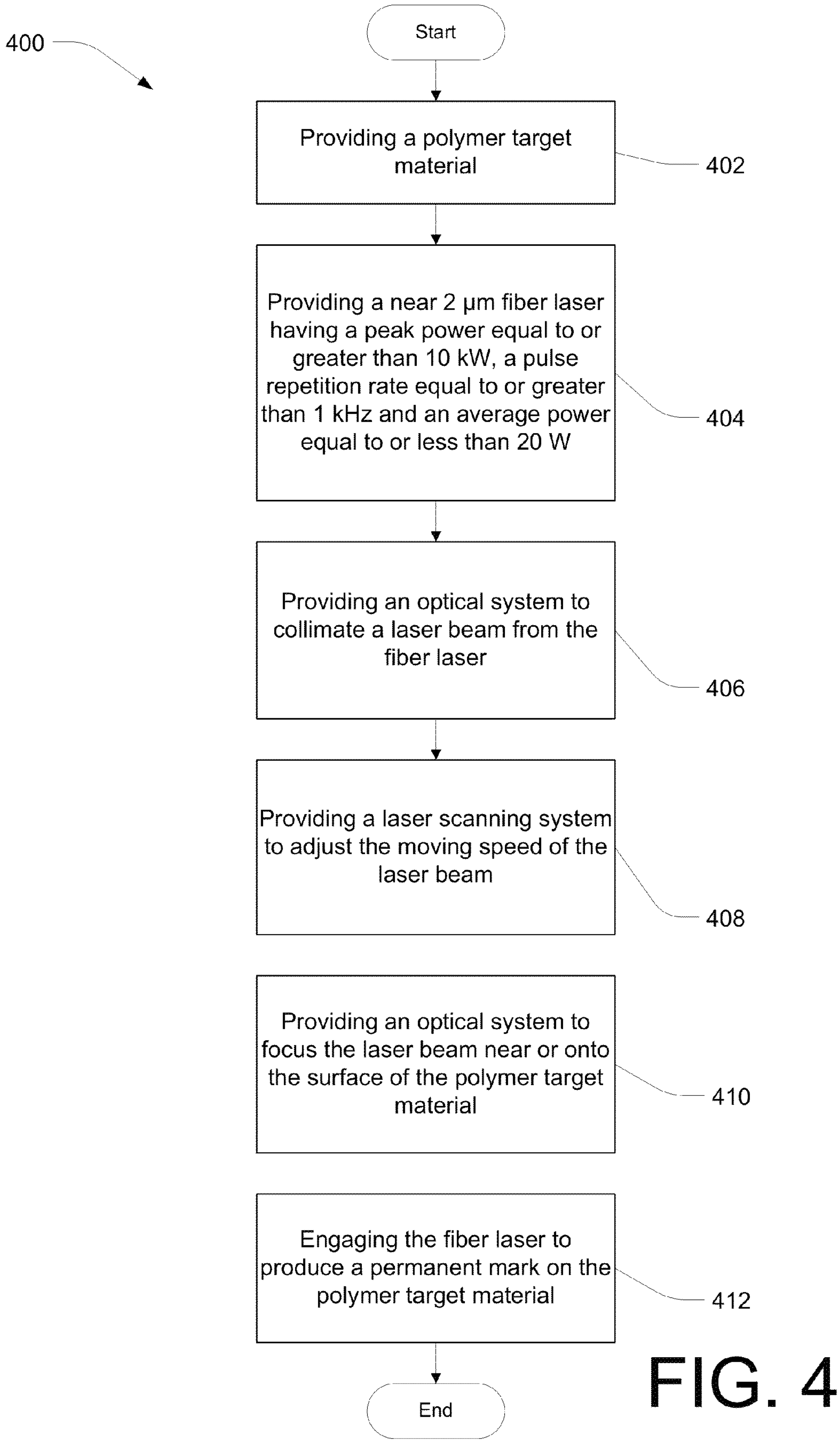
FIG. 4 is a flowchart of an exemplary method of using Applicant's invention to laser mark a polymer material, and in particular a transparent polymer material.

FIG. 4 depicts an exemplary method 400 of using Applicant's invention to produce permanent marks on polymer material, and in particular on transparent polymer material. As is indicated by block 402 and 404, a polymer target material, which is to be laser marked, is provided along with a near 2 μm fiber laser, where the fiber laser has a peak power equal to or greater than 10 kW, a pulse repetition rate equal to or greater than 1 kHz, and an average power equal to or less than 20 W. In certain embodiments the fiber laser provided is a Q-switched fiber laser with a pulse width equal to or less than 200 ns. In other embodiments, the fiber laser is a mode-locked fiber laser with a pulse width equal to or less than 100 ps. In certain embodiments, an optical system is provided to collimate the laser beam from the fiber laser, as is indicated by block 406. Also, in certain embodiments, a laser scanning system is provided to adjust the moving speed of the laser beam, as is indicated by block 408. In certain embodiments, an optical system is further provided to focus a laser beam near or onto the surface of the polymer target material, as is indicated by block 410. Finally, the fiber laser is engaged and used to produce a permanent mark on the polymer target material, as indicated by block 412.

In certain embodiments, individual blocks described above may be combined, eliminated, or reordered.

In certain embodiments, Applicant's invention includes computer readable program code residing in a non-transitory computer readable medium wherein the computer readable program code is executed by a processor to perform one or more of the steps recited in FIG. 4. In other embodiments, Applicant's invention includes computer readable program code residing in any other computer program product, where that computer readable program code is executed by a computing device external to, or internal to, a computing system to perform one or more of the steps recited in FIG. 4. In either case, the computer readable program code may be encoded in a non-transitory computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims. The described implementations are thus to be considered in all respects only as illustrative and not restrictive and the scope of the invention is, therefore, indicated by the appended claims. All changes which come within the meaning and range of equivalency of the claims are to be embraced within their scope.

I claim:

1. A method of laser marking a polymer target material, comprising: providing:

the polymer target material comprising a surface, wherein the polymer target material is transparent at visible wavelengths and without laser marking additives; and a near 2 gm fiber laser, said fiber laser having a peak power equal to or greater than 10 kW, a pulse repetition rate equal to or greater than 1 kHz, and an average power equal to or less than 20 W; and producing a mark with the fiber laser that is not transparent to visible wavelengths on the surface of the polymer target material without damaging the surface of the polymer target material.

2. The method of laser marking of claim 1, wherein said fiber laser is a Q-switched fiber laser having a pulse width equal to or less than 200 ns, wherein said method further comprises engaging said Q-switched fiber laser.

3. The method of laser marking of claim 1, wherein said fiber laser is a mode-locked fiber laser having a pulse width equal to or less than 100 ps, wherein said method further comprises engaging said mode-locked fiber laser.

4. The method of laser marking of claim 1, wherein said producing further comprises making the mark darker than the polymer target material at a visible wavelength.

5. The method of laser marking of claim 1, wherein said producing further comprises generating a temperature of less than 150 degrees C. at a distance greater than 500 μm below the surface of the polymer target material.

6. The method of laser marking of claim 1, further comprising:

providing a laser scanner, wherein said laser scanner adjusts a laser marking speed of the fiber laser; and adjusting the laser marking speed.

7. The method of laser marking of claim 6, wherein said adjusting further comprises setting said laser marking speed to a speed greater than 10 cm/s.

8. The method of laser marking of claim 1, further comprising:

providing an optical system to focus a laser beam from the fiber laser; and focusing the laser beam on to or near the surface of the polymer target material using the optical system.

9. The method of laser marking of claim 1, wherein said producing further comprises producing a surface roughness of less than 10 μm.

10. The method of laser marking of claim 1, wherein said fiber laser comprises a fiber doped with a member of the group consisting of:

thulium;

holmium; and a combination of thulium and holmium;

wherein said producing further comprises generating a near 2 μm laser beam from the fiber laser.

* * * * *

UNITED STATES PATENT AND TRADEMARK OFFICE

CERTIFICATE OF CORRECTION

PATENT NO. : 8,911,658 B2
APPLICATION NO. : 13/450367
DATED : December 16, 2014
INVENTOR(S) : Shibin Jiang It is certified that error appears in the above-identified patent and that said Letters Patent is hereby corrected as shown below:

IN THE CLAIMS:

Column 6, line 45 - “2 gm” should be --2 μm--

Signed and Sealed this
Eleventh Day of August, 2015

Michelle K. Lee
*Director of the United States Patent and Trademark Office*